United States Patent [19]

Cottrell

[11] 4,246,037

[45] Jan. 20, 1981

[54] NOVEL TAMARIND/XANTHAN GUM BLEND

[75] Inventor: Ian W. Cottrell, Solana Beach, Calif.

[73] Assignee: Merck & Co., Inc., Rahway, N.J.

[21] Appl. No.: 47,395

[22] Filed: Jun. 11, 1979

[51] Int. Cl.³ ............................................. C08L 5/00
[52] U.S. Cl. ................................... 106/208; 106/205
[58] Field of Search ..................... 106/205, 208, 209; 252/8.5 C, 316

[56] References Cited

U.S. PATENT DOCUMENTS

| | | | |
|---|---|---|---|
| 3,554,922 | 1/1971 | Berner | 106/208 |
| 3,765,918 | 10/1973 | Jordan et al. | 106/205 |
| 3,930,871 | 1/1976 | Starace | 106/205 |
| 3,953,336 | 4/1976 | Daigle | 252/8.5 C |
| 4,038,206 | 7/1977 | Karl | 106/205 |
| 4,073,653 | 2/1978 | Lindroth | 106/173 R |
| 4,155,314 | 5/1979 | O'Callaghan | 106/208 |

Primary Examiner—Theodore Morris
Attorney, Agent, or Firm—Gabriel Lopez; Hesna J. Pfeiffer; Julian S. Levitt

[57] ABSTRACT

A blend of tamarind kernel powder and xanthan gum has been found to have a synergistically high viscosity in aqueous solution.

13 Claims, No Drawings

NOVEL TAMARIND/XANTHAN GUM BLEND

CROSS-REFERENCE

A cold-water soluble form of TKP is described and claimed in pending application Ser. No. 959,120 filed Nov. 9, 1978. The teachings of that application on the preparation of CWSTG are incorporated herein by reference.

BACKGROUND OF THE INVENTION

Xanthan gum and tamarind kernel powder are both known as thickening agents. Blends of xanthan gum and galactomannans such as locust bean gum and guar gum have been shown to exhibit synergistic viscosity increases. However, such an increase was not heretofore known for xanthan gum and tamarind kernel powder.

SUMMARY OF THE INVENTION

Blends of xanthan gum and tamarind kernel powder are now shown to exhibit synergistic viscosity increases. The blends can be prepared in a variety of ways, either in the solid or liquid state.

DETAILED DESCRIPTION

Tamarind kernel powder (TKP) is a commercially available product obtained by husking and milling the seed kernels of the tree, *Tamarindus indica* (Linn). TKP includes all of the constituents found in the tamarind seed kernel: polysaccharide (composed of uronic acid and the neutral sugars arabinose, xylose, mannose, glucose, and galactose), protein, and other cellular debris from the tamarind kernel seed. TKP is crude and insoluble in cold water (in the range of 5°–35° C.). It is understood by those in the art that, being a crude product, TKP contains trace impurities which vary from shipment to shipment. Among these impurities can be listed metal shavings, wood pulp, cellulose from tamarind seed husks, and other plants and inorganic impurities. Many of these impurities are insoluble in water.

As used herein, the term TKP can also include a cold-water soluble form of tamarind kernel powder identified herein as cold-water soluble tamarind gum.

By xanthan gum is meant the extracellularly produced gum made by the heteropolysaccharide-producing bacterium *Xanthomonas campestris* by the whole culture fermentation of a medium comprising a fermentable carbohydrate, a nitrogen source, and other appropriate nutrients. Processes for producing xanthan gum are well-known (e.g., U.S. Pat. No. 3,433,708). Xanthan gum is commercially available (e.g., KELTROL® is foodgrade xanthan gum available from Kelco, San Diego, California.) Xanthan gum beer, which is a commercially available product, is the post-fermentation contents of xanthan fermentation vats prior to recovery of the gum.

The best evidence presently available suggests that xanthan gum has the formula:

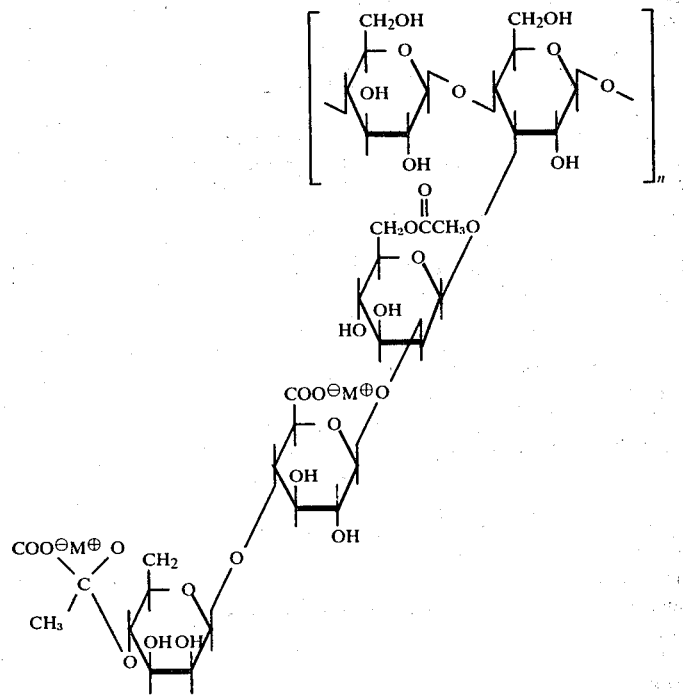

wherein M+ is Na+, K+, or ½ Ca++. Estimates of the molecular weight range from 2–50 million. The organism *Xanthomonas* produces this gum as an acid which is then converted to a salt in the fermentor, the ratio Na+:K+:Ca++ in the recovered gum depending on the fermentation media conditions.

As indicated above, production of the acid form of xanthan gum by *Xanthomonas campestris*, NRRL B-1459, under a variety of fermentation conditions is well known. The inventive feature of this application relates in one of its embodiments to the post-fermentation treatment of xanthan gum beer with TKP, which is independent of the biosynthetic pathway of the Xanthomonas organism in its production of the acid form of xanthan gum. It would be apparent therefore to one skilled in the art that the invention is operative using either B-1459 or a proprietary mutant strain of *Xanthomonas campestris* known by applicant's assignee to produce the acid form of xanthan gum in somewhat higher yields than does B-1459. Since the function of the microorganism is merely to produce the acid form of xanthan gum, availability of this mutant strain is not significant to the practice of this invention.

The synergistic viscosity increase observed with TKP/xanthan gum blends is found at all ranges of TKP:xanthan gum but especially in the range 5:95 to 95:5. (All ratios on a weight:weight basis.) However, it is most pronounced in blends where the TKP:xanthan gum ratio is greater than 1:1. The synergistic effect also varies with the total gum concentration. Surprisingly, the synergistic viscosity increase occurs only at total gum concentrations above about 0.5%.

TKP and xanthan gum can be blended in a variety of ways. For example, TKP and xanthan gum can be mixed as dry powders from which aqueous solutions are then prepared. If this procedure is used, working solutions will be difficult to prepare as TKP is insoluble in cold water. To bring TKP into solution, the powder blend must be dispersed in water and then heated to 70°–75° C. for about five minutes. This is analogous to the well known procedure for making TKP solutions.

An alternate procedure is to first dissolve the TKP in hot water and then add either xanthan gum as a dry powder or in solution.

Another procedure is to first prepare a cold-water soluble form of TKP, described in copending application U.S. Ser. No. 959,120, filed Nov. 9, 1978. This form of TKP, identified herein as CWSTG, is prepared by mixing TKP in water at concentrations of 0.1 to 75%, heating this mix to a temperature of 35°–130° C., and then drying (and optionally milling) the resulting CWSTG. The heating and drying steps can be combined, as in the drum drying process. The milling step is preferred so as to produce minute particles which readily hydrate.

TKP subjected to this process exhibits cold-water solubility. This process does not require the addition of bleaching agents, or any precipitation and/or filtration steps to yield CWSTG. The process conserves time of preparation, reduces reagent costs, and gives yields of approximately 100%. The constraints inherent in said process are governed by temperature, time, and pressure relationships, i.e., at lower temperatures, longer periods of time are required to develop full solubility.

CWSTG can be defined in terms of the viscosity of a solution prepared with cold water (i.e., 5°–35° C.). A CWSTG aqueous solution prepared by adding CWSTG powder to cold water and mixing under moderate shear (e.g., Lightnin Mixer at 800–1,000 rpm) for one hour develops a viscosity of greater than 10 cP (Brookfield LVF viscometer, spindle 1, 60 rpm) at a 1% concentration and greater than 1,000 cP (Brookfield LVF viscometer, spindle 3, 60 rpm) at 10% concentration.

Heating of the TKP/water mix can be accomplished by various methods, including, but not limited to, infrared irradiation, conventional steam heating, drum drying, and microwave heating. The temperature range necessary to achieve cold-water solubility is from 35° C. to just below degradation temperature of TKP; preferably 35°–130° C. TKP held at lower temperatures requires a longer time for viscosity to develop and does not develop the same viscosity as TKP held at higher temperatures. The optimum temperature range is 70°–100° C. at atmospheric pressure.

It is preferred that the TKP concentration range from 4% to 60%. A still more preferred range is 20% to 50%.

In the practice of this invention, the CWSTG is dry mixed with xanthan gum just as TKP is mixed with xanthan gum. The difference between these two embodiments of the invention is that the CWSTG and xanthan gum blend of the invention does not require heating to yield viscous aqueous solutions.

In yet another procedure for blending TKP with xanthan gum, TKP is added to xanthan gum beer. As the beer is typically pasteurized prior to precipitation, TKP can economically be added to the beer, preferably after fermentation is complete, and heat treated along with the beer itself. The normal lower alcohol precipitation will also precipitate out the TKP so that the product of the drying and milling operations is a coprecipitate of TKP/xanthan gum, the blend of this invention.

The novel blend of this invention can be used in any application requiring viscous solutions. As TKP could not be used in e.g., food grade products, such high purity uses are not possible for the blend of this invention. One industrial use for the novel blend of this invention is the following print paste which gives very good fine-line control in printing 100% nylon carpets:

35.0 g Thickener (80% TKP/20% xanthan gum
8.5 g Merpacyl yellow 9G
14.2 g Merpacyl red G
0.5 g Merpacyl blue 2GA
0.2 g Tergitol 15-S-9
0.1 g Foamgard NS-100
5.0 g EDTA (Na$_4$)
15.0 g Dowanol EPH
25.0 g Formic acid to 1 liter with H$_2$O Another use of the blend is as a fluid loss control additive and rheology modifier for oil well drilling, workover, and completion fluids. The blend could be used by itself or with other drilling, workover, and completion fluid additives. The blend functions in most salt waters used in these operations.

The invention is further illustrated by the following examples, which are not intended to be limiting.

EXAMPLE 1

DRY BLENDED METHOD

Dry blends of xanthan gum and TKP are prepared at various ratios by weight and solutions of the blends were prepared at 1.0% w/w final concentration in deionized water, by heating to 80° C. with stirring in a water bath. After cooling to room temperature the viscosities of the solutions and 1% solutions of xanthan gum and TKP (also heated to 80° C. and cooled) are determined using a Brookfield LVF viscometer at 60 rpm, using the appropriate spindle. The actual viscosities of the solutions, the predicted viscosities (mathematical average) of the blends and the synergism observed are shown in Table 1. Spindles used are: No. 1 (0–100 cP), No. 2 (100–500 cP), No. 3 (500–2000 cP), and No. 4 (>2000 cP).

TABLE 1

Synergism of TKP/xanthan Gum Blends

| Blends | | Theoretical | Actual | % |
|---|---|---|---|---|
| Xan. Gum | TKP | Visc. (cP) | Visc. (cP) | Increase |
| 100 | 0 | — | 950 | — |
| 80 | 20 | 770 | 920 | 19.5% |
| 60 | 40 | 580 | 800 | 38% |
| 40 | 60 | 400 | 600 | 50% |
| 20 | 80 | 220 | 350 | 59% |

TABLE 1-continued

| Synergism of TKP/xanthan Gum Blends | | | | |
|---|---|---|---|---|
| Blends | | Theoretical | Actual | % |
| Xan. Gum | TKP | Visc. (cP) | Visc. (cP) | Increase |
| 0 | 100 | — | 40 | — |

EXAMPLE 2

CO-PRECIPITATION FROM XANTHAN GUM BEER

TKP is incorporated into xanthan gum fermentation beer at a level of 50%, 100% and 300% by weight based upon the weight of xanthan gum in solution. Specifically, 10 gm, 20 gm, and 60 gm amounts of TKP are added to separate aliquots (1 liter) of xanthan gum fermentation beer (2.0% gum concentration). The TKP is dispersed by stirring and the temperature raised to 80° C. by heating on a hot plate and the temperature maintained for 5 minutes. The samples are allowed to cool to room temperature and the polysaccharides precipitated from solution with isopropanol (2.5 vol.) dried in a steam oven (60° C.) and milled through 40 mesh.

The polysaccharide mixtures are soluble in water upon stirring at room temperature. The viscosities (see Table 2) (1%, 2% and 3% in distilled water) are recorded for the samples and control samples of xanthan gum and TKP (which had been solubilized by heating the solution to 80° C.).

The viscosities of these mixtures which are prepared by mixing in the beer, under conditions of raised temperature, are higher than predicted based upon the viscosity of xanthan gum and TKP solutions prepared in a similar manner. The synergistic effect is more pronounced with higher total gum concentrations.

TABLE 2

| Synergism of Co-Precipitated Blends | | | | | | | | | |
|---|---|---|---|---|---|---|---|---|---|
| Blend | | 1% Conc. | | | 2% Conc. | | | 3% Conc. | |
| X.G. | TKP | Theo. Visc. | Actual* Visc. | % Inc. | Theo. Visc. | Actual Visc. | % Inc. | Theo. Visc. | Actual Visc. | % Inc. |
| 100% | 0 | — | 800 | — | — | 1980 | — | — | 2900 | — |
| 66% | 33% | 540 | 650 | 20% | 1430 | 2170 | 52% | 2620 | 4100 | 56.5% |
| 50% | 50% | 400 | 530 | 32.5% | 1170 | 2030 | 73.5% | 2480 | 4230 | 70.5% |
| 25% | 75% | 220 | 300 | 36% | 760 | 1420 | 87% | 2270 | 4000 | 76.0% |
| 0 | 100% | — | 33 | — | — | 360 | — | — | 2060 | — |

*Brookfield LVF Viscometer 60 rpm, appropriate spindle.

EXAMPLE 3

PRE-HYDRATING TKP

1% and 2% TKP solutions are prepared in deionized water by heating with stirring to 85° C. and the temperature maintained for 15 minutes. Viscosity begins to form at ≈75° C. Upon cooling to room temperature, the solution viscosities are (Brookfield LVF Viscometer, 60 rpm):

1.0% —90 cP
2.0% —450 cP

The viscosities of 1% solutions of xanthan gum (KELZAN®), 1% TKP, and a solution containing equal parts by volume of 1% xanthan and 1% TKP were determined (Brookfield LVF viscometer, 60 rpm):

1% TKP=90 cP
1% Xanthan Gum=1200 cP
0.5% Xanthan/0.5% TKP=920 cP

The observed synergistic viscosity increase (43%) is examined further using higher concentrations (2% and 3%) of TKP. A synergistic viscosity increase was observed between xanthan gum and TKP at all concentrations.

EXAMPLE 4

PREPARATION OF COLD-WATER SOLUBLE TAMARIND GUM

TKP is dispersed in water to a concentration of 20%, heated to 95° C. for 10 minutes, then dried and milled. The resulting product (CWSTG) is dissolved in water at 20° C. and develops a viscosity of 35 cP at 1% concentration, measured on a Brookfield LVF viscometer, spindle 1, 60 rpm, at room temperature.

EXAMPLE 5

PREPARATION OF COLD WATER SOLUBLE TAMARIND GUM

TKP is dispersed in water at ambient temperature at a concentration of 40%. The resulting paste is drum dried with internal steam pressure at 40 psi, and then milled. The resulting product (CWSTG) readily dissolves in ambient-temperature water and imparts a viscosity of 30 cP at 1% concentration, measured on a Brookfield LVF viscometer, spindle 1, 60 rpm, at room temperature.

What is claimed is:

1. A blend of xanthan gum and TKP.
2. A blend of claim 1 wherein the ratio TKP: xanthan gum ranges from 95:5 to 5:95.
3. A blend of claim 2 wherein the ratio TKP:xanthan gum ranges from 80:20 to 20:80.
4. A blend of claim 2 where the ratio TKP:xanthan gum is greater than 50:50.
5. A blend of claim 2 wherein the ratio TKP:xanthan gum is 80:20.
6. A blend of claim 2 or 3 wherein the TKP is cold-water soluble.
7. An aqueous solution of xanthan gum and TKP wherein the total gum concentration ranges from 0.5 to 3% (w/w).
8. A solution of claim 7 wherein the total gum concentration ranges from 1.0 to 3.0% (w/w) and the TKP:xanthan gum ratio ranges from 80:20 to 20:80.
9. A process for preparing a blend of xanthan gum and TKP which comprises preparing a mix of TKP in water at a concentration of 0.1 to 75%, heating this mix to a temperature of 35°-130° C., and adding thereto xanthan gum.
10. A process of claim 9 wherein the TKP:xanthan gum ratio ranges from 80:20 to 20:80.
11. The process of claim 9 wherein the xanthan gum is added at room temperature.
12. The process of claim 9 wherein the heated mix is dried and milled prior to adding thereto the xanthan gum.
13. A process for preparing a blend of xanthan gum and TKP which comprises adding TKP to xanthan gum beer then heat treating said beer and then coprecipitating said blend.

* * * * *